US011836130B2

(12) United States Patent
Beckett et al.

(10) Patent No.: US 11,836,130 B2
(45) Date of Patent: Dec. 5, 2023

(54) RELATIONAL DATABASE BLOCKCHAIN ACCOUNTABILITY

(71) Applicants: Devon Andrew Beckett, Denver, PA (US); James David Fletcher, Royersford, PA (US); Max Hirsch, Laverock, PA (US); Vidya Mudalagiri Venkatesha, Paoli, PA (US); Alex George, King of Prussia, PA (US)

(72) Inventors: Devon Andrew Beckett, Denver, PA (US); James David Fletcher, Royersford, PA (US); Max Hirsch, Laverock, PA (US); Vidya Mudalagiri Venkatesha, Paoli, PA (US); Alex George, King of Prussia, PA (US)

(73) Assignee: Unisys Corporation, Blue Bell, PA (US)

( * ) Notice: Subject to any disclaimer, the term of this patent is extended or adjusted under 35 U.S.C. 154(b) by 617 days.

(21) Appl. No.: 16/597,883

(22) Filed: Oct. 10, 2019

(65) Prior Publication Data
US 2021/0109916 A1 Apr. 15, 2021

(51) Int. Cl.
*G06F 16/23* (2019.01)
*H04L 9/06* (2006.01)
*H04L 9/00* (2022.01)

(52) U.S. Cl.
CPC ........ *G06F 16/2379* (2019.01); *H04L 9/0637* (2013.01); *H04L 9/50* (2022.05)

(58) Field of Classification Search
CPC ...... G06F 16/2379; H04L 9/0637; H04L 9/50
See application file for complete search history.

(56) References Cited

U.S. PATENT DOCUMENTS

| | | | |
|---|---|---|---|
| 2005/0154845 A1* | 7/2005 | Shackelford | G06F 11/2064 714/E11.107 |
| 2006/0062392 A1* | 3/2006 | Lee | H04L 9/0852 380/278 |
| 2008/0077612 A1* | 3/2008 | Zobin | G06F 16/2477 |
| 2009/0319753 A1* | 12/2009 | Welc | G06F 9/466 711/E12.078 |
| 2016/0314161 A1* | 10/2016 | Wen | G06F 16/2329 |
| 2018/0359096 A1* | 12/2018 | Ford | G06Q 20/29 |
| 2019/0121888 A1* | 4/2019 | Wei | G06F 16/2358 |
| 2019/0171838 A1* | 6/2019 | Struttmann | H04L 9/3239 |

(Continued)

*Primary Examiner* — Hares Jami
(74) *Attorney, Agent, or Firm* — SHOOK, HARDY & BACON L.L.P.

(57) ABSTRACT

The present invention provides for employing SQL to introduce blockchain technologies into a relational database, and thereby leverage the inherent tamper-resistant properties of blockchain, without the need to completely rewrite existing or legacy relational database software. The invention creates a relational database inside of a blockchain and uses a conventional SQL interface for standard database operations. This reduces the burden of introducing blockchain technologies, while providing the benefits of the intrinsic security and verification features of blockchain technology. The invention provides a rich historical record of every transaction thereby greatly reducing, if not eliminating, the relational database's susceptibility to tampering. This allows for temporal queries on arbitrary records within the database and the generation of reports and audits for any point in the history of the database.

17 Claims, 3 Drawing Sheets

(56) References Cited

U.S. PATENT DOCUMENTS

2020/0117730 A1* 4/2020 Vaswani ............... H04L 9/3247
2020/0117825 A1* 4/2020 Vaswani ............... H04L 9/0897
2020/0409952 A1* 12/2020 Dean ................... G06F 16/9024

* cited by examiner

RELATIONAL DATABASE BLOCKCHAIN ACCOUNTABILITY

BACKGROUND OF THE INVENTION

Relational databases have been employed in various forms since the 1970's. In their simplest form, relational databases provide a means of organizing data in a table structure, comprised of rows and columns, as opposed to a purely hierarchical or navigational structure. Relational databases have been widely adopted for the storage and management of information and can be scaled-up to accommodate large quantities of data while still offering high-performance. Relational databases have also proven very flexible in adapting to new hardware configurations and technologies.

Structured Query Language ("SQL"), a domain-specific programing language, has become the de facto language utilized to interact with the majority of relational database systems and services. SQL first appeared in 1974 and moved to quickly become an industry standard by 1986. One of many, this query language is specifically used for managing data stored in Relational Database Management Systems. SQL offers the concept of accessing multiple entries with a single access operation, not previously seen in older query languages, and offers the ability to access records without specifying how to reach it. Over time, SQL has been reimagined in different variations, such as MySQL, MSSQL, Oracle, DB2, PostgreSQL, etc. These variations include some of the most popular database access languages in the world.

Standard relational databases enable users to manage predefined data relationships across multiple databases, and/or multiple table within those databases. Popular examples of relational databases include Microsoft SQL Server, Oracle Database, MySQL and IBM DB2. Cloud-based relational databases, or database as a service (DBaaS), have also become widely available, enabling companies to outsource database maintenance, patching and infrastructure support requirements. Examples of such relational databases services include the Amazon Relational Database Service (RDS), Google's Cloud SQL, IBM's DB2 on Cloud, SQL Azure and Oracle Cloud.

Given the widespread and decades-long use of relational databases on both client-owned hardware systems, as well as within newer cloud-based and outsourced platforms, there has arisen a need for a verifiable means of ensuring the security and accountability of the data stored within such systems. This particularly of concern in shared-access relational databases, and including cloud-based database services that are likely hosted on hardware platforms the physical security of which end-users have little or no control over. This is particularly concerning in computing environments wherein the relational database is accessed by multiple parties having a limited amount of trust between them.

BRIEF SUMMARY OF THE INVENTION

The present invention provides for employing SQL to introduce blockchain technologies into a relational database, and thereby leverage the inherent tamper-resistant properties of blockchain, without the need to completely rewrite existing or legacy relational database software. The invention creates a relational database inside of a blockchain and uses a conventional SQL interface for standard database operations. This reduces the burden of introducing blockchain technologies, while providing the benefits of the intrinsic security and verification features of blockchain technology. The invention provides a rich historical record of every transaction thereby greatly reducing, if not eliminating, the relational database's susceptibility to tampering. This allows for temporal queries on arbitrary records within the database and the generation of reports and audits for any point in the history of the database.

BRIEF DESCRIPTION OF THE DRAWINGS

The aspects, and advantages of the present invention will become better understood with regard to the following description, appended claims, and accompanying drawings in which:

DETAILED DESCRIPTION

Within any system for the persistent storage of information, such as a relational database, there exists a need to provide user-interface conventions to enable the viewing, searching, and modifying the information stored therein. In SQL-based relational databases, the fundamental functions Create, Read, Update, and Delete enable these actions and are commonly referred to by the acronym CRUD. The SQL-statements for each of these functions are provided below:

Create

Create performs an insert to create or add new entries. In SQL, the create function is denoted as: INSERT. An insert statement has the following standard form:

INSERT INTO table(column1[,column 2, . . . ])VALUES(,value2, . . . ]);

Read

Read is used to read, retrieve, search, or view existing entries in a database. The select query has the following standard form:

SELECT column 1,column2,FROM table [WHERE Condition];

Update

Update is used to modify existing entries in a database. The update statement has the following standard form:

UPDATE table SET column=value [,column= value . . . ][WHERE condition];

When using the update function, either all rows can be updated or a subset can be chosen using a condition.

Delete

Delete is used to deactivate or remove existing entries. The delete statement has the following standard form:

DELETE FROM table [WHERE condition];

Blockchain technology relies upon the creation of a growing list of records, called transactions, that are cryptographically linked. Each block in the chain contains a hash (encrypted representation) of the previous block, a timestamp, and data. A primary advantage of blockchain technologies are their innate security. Blockchain is generally implemented as an open, distributed ledger, often in a peer-to-peer network where a new block requires validation by a majority of the peers. Since each block contains a hash of the previous blocks, it does not allow for alteration of a given block without altering every previous block in the chain, and validation by majority would be needed for every such alteration. This prevents bad actors from altering past blocks and allows for a secure record of the chain's history.

Blockchain Terminology

The following definitions are provided so as to establish a common framework for describing the blockchain technology utilized in a preferred embodiment of the invention.

Transaction

Figure 1:
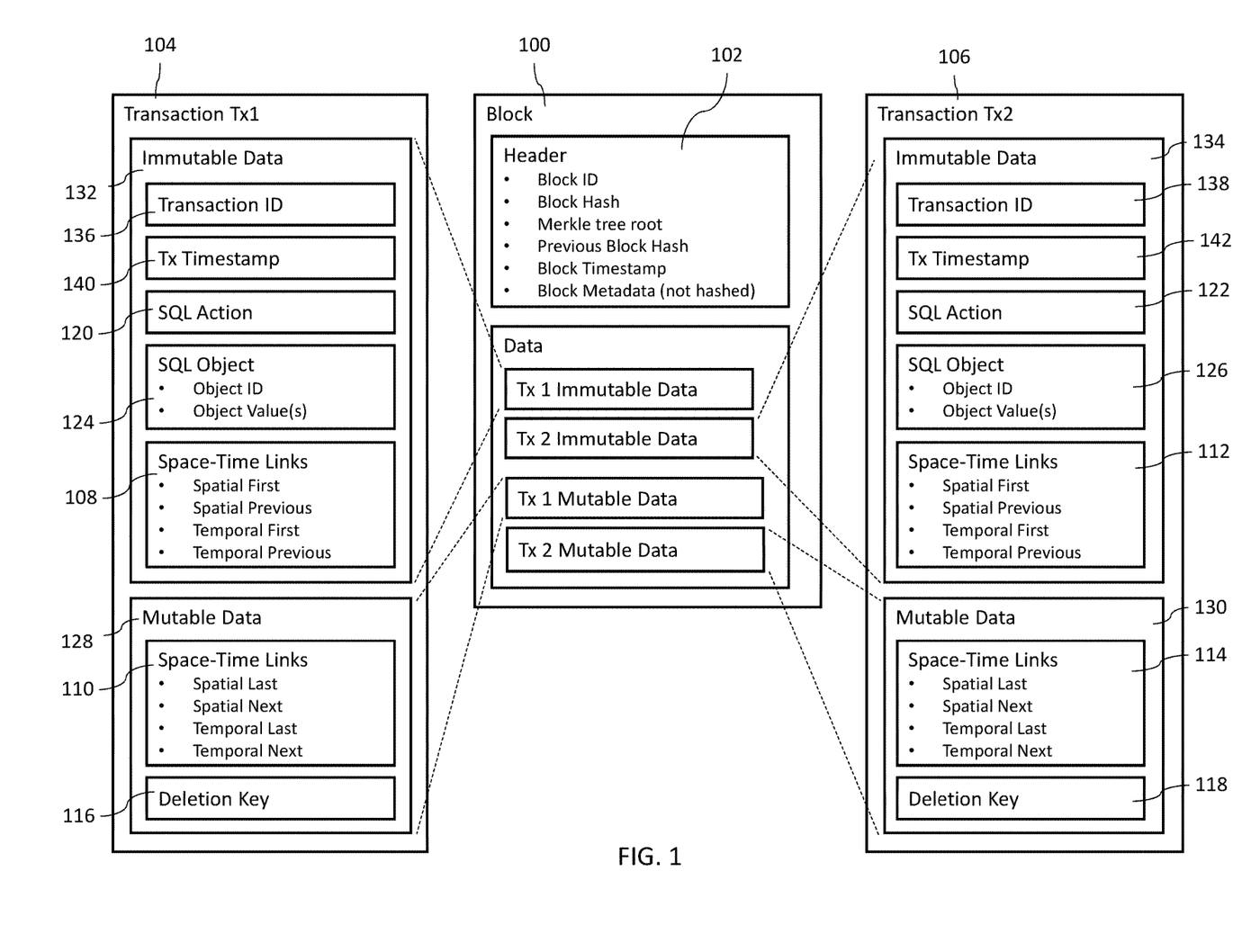
FIG. 1 is representation of a system supporting an embodiment of the present invention.

A transaction 104, 106 is an individual, indivisible operation that takes place on the blockchain. This is the actual action performed and stored in a block on the blockchain. Transactions can be stored individually or grouped together in a single block.

Cryptographic Hash

A cryptographic hash takes an input and produces a single fixed length output (typically 256-bits in length). These hashes offer an innate security, as it is infeasible to generate a malicious message without corrupting the hash value. If the data is changed, so is the hash. The altered data will result in an altered hash. The hashes can therefore be used to verify the integrity of the data inside a transaction.

Merkle Tree

Also called a hash tree, Merkle trees are used to validate all the transactions in a block. Transactions are hashed individually, and then groups of resulting hashes are recursively hashed together until only a single hash is left. The single, remaining hash is known as the Merkle root. Merkle trees are well-known means of validating large amounts of data.

Block

As shown in FIG. 1, a block 100 is a container data structure where data is permanently written onto a blockchain. A block contains a header 102 and transaction data 104, 106. The header contains the block ID, the block's hash, block metadata (unhashed), the previous block's hash, a Merkle tree root, and a timestamp. Every block uses the previous block's hash to construct its own. This method of hashing creates a chain whereby the hash of any given block is dependent upon all previous blocks. Any alteration to those blocks would invalidate the hash and cause all subsequent blocks to seem invalid. Because of this, new blocks are added to the end of the blockchain. Once written, blocks cannot be altered or removed without rewriting every subsequent block in the chain.

Nodes

In terms of a blockchain network, a node is any computer that connects to and participates in the blockchain network. All nodes are generally considered equal even though they may serve a different role. A node is not required to be a part of the validation or consensus mechanism and is not even required to store the entire blockchain.

Blockchain Applied to a Relational Database

Figure 2:
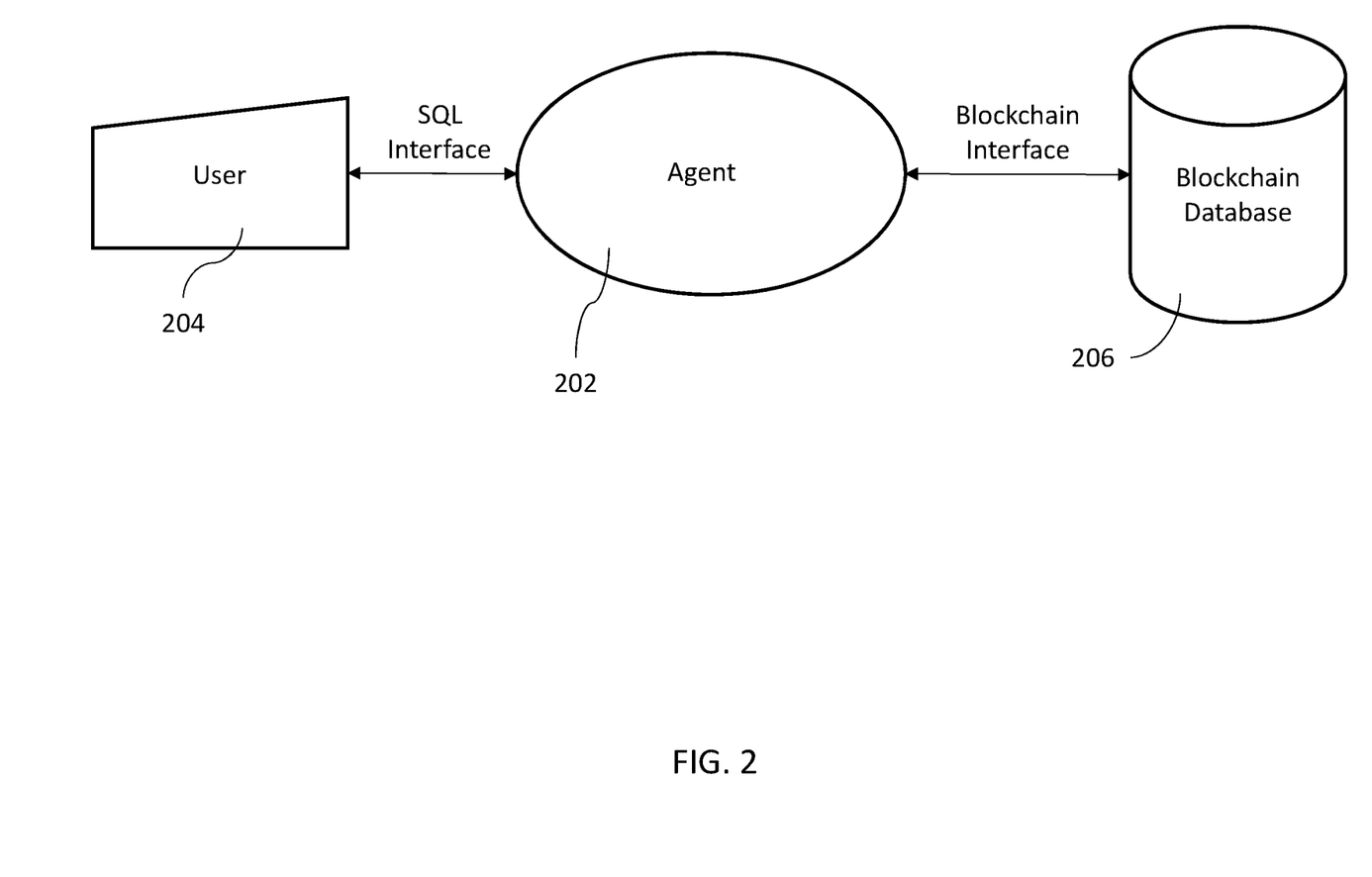
FIG. 2 is a flowchart depicting Agent functionality in a preferred embodiment of the invention.

The present disclosure provides a system and method wherein records of actions performed on databases are stored within a blockchain as transactions. As shown in FIG. 2, it utilizes a specialized server application 202 situated between the user 204 and the Blockchain database 206. This server application is referred to as the Agent 202 and it translates SQL actions into blockchain actions. Users connect to the Agent as if it were a normal SQL server, and the Agent will read and write to the blockchain as described herein.

Every Create, Update, or Delete performed on the Blockchain database is represented by a transaction added to the blockchain. Every transaction will be made up of four distinct components: Space-Time Links 108, 110, 112, 114, Deletion Key 116, 118, SQL Action 120, 122, and the SQL Object 124, 126. The Space-Time Links 108, 110, 112, 114 allow the Agent 202 to navigate the blockchain more efficiently. The Deletion Key 116, 118 is used to facilitate the destruction of data. The SQL Action 120, 122 serves to inform the Agent 202 as to what action was performed with the present transaction, what user performed the action, and when the action was performed. The SQL Object 124, 126 is a copy of the object being acted upon after the action is complete, and can represent anything from a directory of all databases stored within the blockchain, down to the very cells of a table. These components will be discussed in more detail subsequently.

Space-Time Linking

Blockchain stores transactions that update objects within the database. This treats the blockchain as a log of all actions performed on the database. This enables the ability to rebuild what the database looked like at any given point in time, using nothing more than the information stored within the blockchain.

The key to this lies in using a blockchain that supports mutable data sections 128, 130 and immutable data sections 132, 134 within each transaction 104, 106. The mutable data section 128, 130 would be excluded from the hash function of the transaction or the transaction ID 136, 138. There are two uses for the mutable data sections. The first use enables updating data on the blockchain, not by updating the SQL Object 124, 126 directly, but by updating a link to a newer version of the SQL Object 124, 126 that was committed to the blockchain afterwards. The second use enables data to be deleted from the relational database without having to remove it from the blockchain, via a deletion key 116, 118.

In order to do meaningful work with a database, it is often required to perform multiple queries with various search filters and sorting requirements. A typical database uses various indexing methods to reduce the search space that is actually required when performing a query. The present invention provides every transaction on the chain with a series of Temporal and Spatial Links, or Space-Time Links 108, 110, 112, 114 that enable the Agent 202 to search through the blockchain so as to quickly and efficiently find the relevant transactions. These links allow the Agent 202 to find the most up-to-date version of a piece of data and find related data, such as the other records or rows in a table.

Consequently, when performing a query on a single table, the Agent 202 will not be required to scan the entire blockchain for all transactions belonging to that table. By traversing from neighbor to neighbor, following the spatial links rather than the path of blockchain, irrelevant transactions are passed over, regardless of ordering on the blockchain itself.

By keeping these mutable links 128, 130 updated the Agent 220 will always be able to traverse through the database and retrieve current data. However, leaving a portion of the transaction mutable requires special provisions to avoid tampering with the links or the creation of invalid links. For this reason, the Space-Time Links must be doubly linked—both forwards and backwards. The backward links (Spatial First, Temporal First, Spatial Previous, Temporal Previous) are written to the immutable portion 132, 134 of the transaction 104, 106 so they cannot be tampered with. Any time a new piece of data is added to the database, or existing data is updated, the Agent 202 would already have knowledge of its existing neighbor or former self. The existing transaction can be linked to the new transaction at the time of creation. This provides a means of integrity checking the links for every transaction.

When inserting a new transaction, the following rules are used for Space-Time links 108, 110, 112, 114. The temporal first link is where the SQL Object 124, 126 was created. The temporal previous link is the most recent version of the SQL Object 124, 126 before the new transaction. A Create transaction has no temporal previous or first so these would be left null. As for the spatial links, the spatial first points to the head of a list and the spatial previous points to the most recent version of the previous item in a list. These backwards links are fixed and need to be included at the time the transaction is completed.

Forward facing links (Spatial Last, Temporal Last, Spatial Next, Temporal Next) are not necessarily known at the creation of the transaction. In cases where they are not known, they are updated later as the result of another transaction. Temporal next links should point to the next transaction for the object and the temporal last links should point to the latest transaction for the object. The temporal last is only guaranteed to point to a newer transaction. The database could be in a state where an older transaction links to a newer transaction, but not the newest. This can slightly increase data retrieval times. When a new transaction is created, and is the tail of a spatial list, the spatial previous transaction must update its spatial next and spatial last to point to the new transaction.

Additional maintenance needs may also be carried out by Agent 202 to perform integrity checks on the links and make repairs as necessary. This maintenance could be implemented as a background process that continuously scans for issues, only consuming system resources when they are available, or as part of scheduled maintenance downtime.

Temporal Links provide the ability to perform temporal querying of SQL databases. An example of a statement effecting a temporal query is provided below:

SELECT*FROM EMPLOYEES FOR SYSTEM_TIME AS OF '2015-09-01 T10:00: 00.7230011';

This statement would return all the fields of each record from the EMPLOYEES table as of the date, Sep. 1, 2015. Such a record might have a date hired field included in the query, but this would give the state of the database on that date, which may have records that have been deleted. Temporal Links provide an easy way to perform audits and maintain database integrity.

Cryptographic Keys

Another use for mutable data 108, 110 in the transaction 104, 106 is the facilitation of deletion. Typically, when data is deleted from a blockchain, a transaction is committed to the blockchain to indicate that the data had been deleted, since removing it from the blockchain would result in refactoring the entire chain. Given the ever-increasing regulation on a person's private data, and some regions enacting "right to be forgotten" laws, this may not be enough, as vestiges of the deleted data would persist in the blockchain. To address this issue, when data is removed within the present invention, the data for each transaction is encrypted with a unique deletion key 116, 118. This key is stored inside the mutable portion of the transaction. This key enables any authorized node to decrypt the data just by reading the transaction. When a request is made to delete the data permanently, the key is either scrambled or zeroed out, rendering the deleted data (and any vestige thereof) irretrievable. Additional security can be provided by encrypting or splitting the key. Data protected by such an encrypted or split key would only be accessible to an Agent 202 that had access to some externally shared secret.

SQL Action

For any given transaction 104, 106, one of three actions can be performed on a SQL Object such as Create, Update, or Delete. Along with the type of action being performed, a timestamp 140, 142 and user is recorded in the transaction 104, 106. This allows a database audit to show when the action was performed and by which user. These may not be the same as what would be reflected in the blockchain transaction, so they are stored here to report within the context of a SQL database.

This design allows for a fourth and optional action, Read, to be recorded on the blockchain as a transaction, thereby permitting all of the CRUD operations to be recorded. Although it is generally not worth the data/operation overhead to record every time an Agent 202 reads a SQL Object 124, 126 it may be of value to record when a user reads a SQL Object 124, 126. For example, this feature could be enabled so that only Read transactions where the SQL Object 124, 126 was actually returned to the user are recorded. This would avoid burdening the blockchain with unimportant Read transactions that could affect SQL Query search times.

SQL Object

SQL Object 124, 126 is the generic term used for all the SQL related objects stored on the blockchain. This refers to the global directory of all databases stored within the blockchain, a specific SQL database, table, row, and any other significant object within the database.

Every SQL Object 124, 126 needs to have a unique ID so it can be referenced by the Agent. Typically, a blockchain transaction ID is generated by using a hashing algorithm, such as SHA256, on the body of the transaction, which is generally considered to create unique values. The same method can be used to generate a SQL Object ID. The Agent 202 can perform a hash of the initial version of the SQL Object 124, 126 used for the Create transaction and record that as the SQL Object ID. This would need to be included in the Create transaction for the object to ensure a proper chain is maintained for that object. For Delete and Read actions, the SQL Object ID is all that is needed in the SQL Object 124, 126 portion of the transaction 104, 106. However, Create and Update actions require the SQL Object 124, 126 to be included in the transaction 104, 106.

As for the actual data stored in a database, there are two primary methods for storing data, which are not mutually exclusive. The first treats every piece of data as a separate object on the blockchain, and the second looks to group together clusters of data, such as a single row on the table. The former has the advantage of saving space when only updating one field in a row, whereas the latter has the advantage of being able to add a whole record in a single blockchain transaction. These methods are referred to as Update Optimized Data Model and Insert Optimized Data Model, respectively, and there are merits to both of these approaches.

Insert Optimized Data Model

The initial transaction holds a SQL object 124, 126 structure referred to as the database directory. The database directory holds a list of links to database SQL objects.

The database SQL object holds the current list of tables that are owned by and defined within that database. There are links to each table SQL Object that are maintained by the database object. Each table object functions very similarly to the previous objects. It contains a template that describes the fields contained by the table and a link to a list of SQL row objects that are currently in the table. A SQL row consists of the data organized in a format described by the row object's parent table structure.

The model offers the ability to perform quick inserts into the database. An insertion only requires the Agent 202 to find the database in the directory, then seek out the table within the database, and append the new row onto the end of that table's row list structure. Typically, when a new row is created, there are required fields that need to be filled in or the row will be rejected. This model also allows for that verification before inserting on the blockchain.

Update Optimized Data Model

The Update Optimized data model works the same way as the Insert Optimized data model for all the structures above the table in the object hierarchy. The directory, database, and table definitions remain the same. The difference lies in how the content within the table is represented on the blockchain.

When creating a relational database in accordance with this invention, the storage requirements will continue to grow with every transaction. This is an intrinsic property of blockchain, and cannot be engineered around without creating a fork, or performing a time-consuming refactor of the blockchain. Both of these options result in the loss of historical data. Instead, the database must be designed around limiting the amount of unnecessary replication of data, keeping the storage requirements low.

For this reason, in the Update Optimized data model prioritizes replicating as little data as possible. A transaction 104, 106 is inserted on the blockchain for each individual cell in the table. This allows for granular updates to the data without replicating the rest of the associated row. For example, if a table was storing customer information, and that customer updated their phone number, a new transaction would be added to the blockchain with the updated phone number only. None of the customer's other information would be replicated in this transaction. Each transaction would still need to contain the Space-time links 108, 110, 112, 114 in order to enable the proper associations to be made when navigating through the database, but the rest of the row would not be replicated. This is especially advantageous if the row contains a column with a large data type, such as image data.

Advantages and Disadvantages

Each of the two models has a different approach to how the data within a table is represented on the blockchain. They both have their own advantages and limitations.

The downside of using the Insert Optimized model the need to replicate the data for an entire row when making an update. While not overly detrimental when dealing with text or numbers, if the table contains something larger, like an image, that image data must be replicated every time the row is updated.

The downside of using the Update Optimized model is that inserting a new row into a table becomes a complex and time-consuming operation. If a table has 200 columns, then all 200 of them have to be added before the table can be updated to know of the row's existence. This would mean adding 200 transactions, which could take quite a bit of time depending on the blockchain technology chosen for implementation. Until the entire row is committed to the blockchain, allowing it to be returned in a query would mean that only part of the row was being returned. Allowing or preventing reads of uncommitted, partially committed, or "dirty" data remains an unresolved topic in database management systems.

The present invention utilizes one or the other of these two models to maximize the advantage provided by each. When a new row is inserted into a table, the Insert Optimized model is used. Then, as a background maintenance process or as part of the first update operation, the individual cells of the row could be broken out into their own block, as described in the Update Optimized model. This can be achieved by first creating the individual cells and inserting them on the blockchain. Then insert an update transaction for the original row transaction containing a list of pointers instead of the actual data.

The previously described combination data model may be implemented as an optional behavior. If the database is only going to be storing a small amount of data per row, then the extra space required for the pointers and extra transactions added to the blockchain may end up using more storage space instead of less. The problem can also be mitigated through careful design of the tables and data relationships if care is taken from the beginning. It may not be reasonable to shill responsibility to the database designer when the problem can be resolved in the product design.

By combining the two data models and allowing their usage to be configured, the database can be better tailored to the needs of the database customer.

Agent

As previously stated, Agent 202 is a component that serves as an interface between a user 104 and the relational database 106. It is the interface between the users and the blockchain itself, and is responsible for various maintenance actions.

Figure 3:
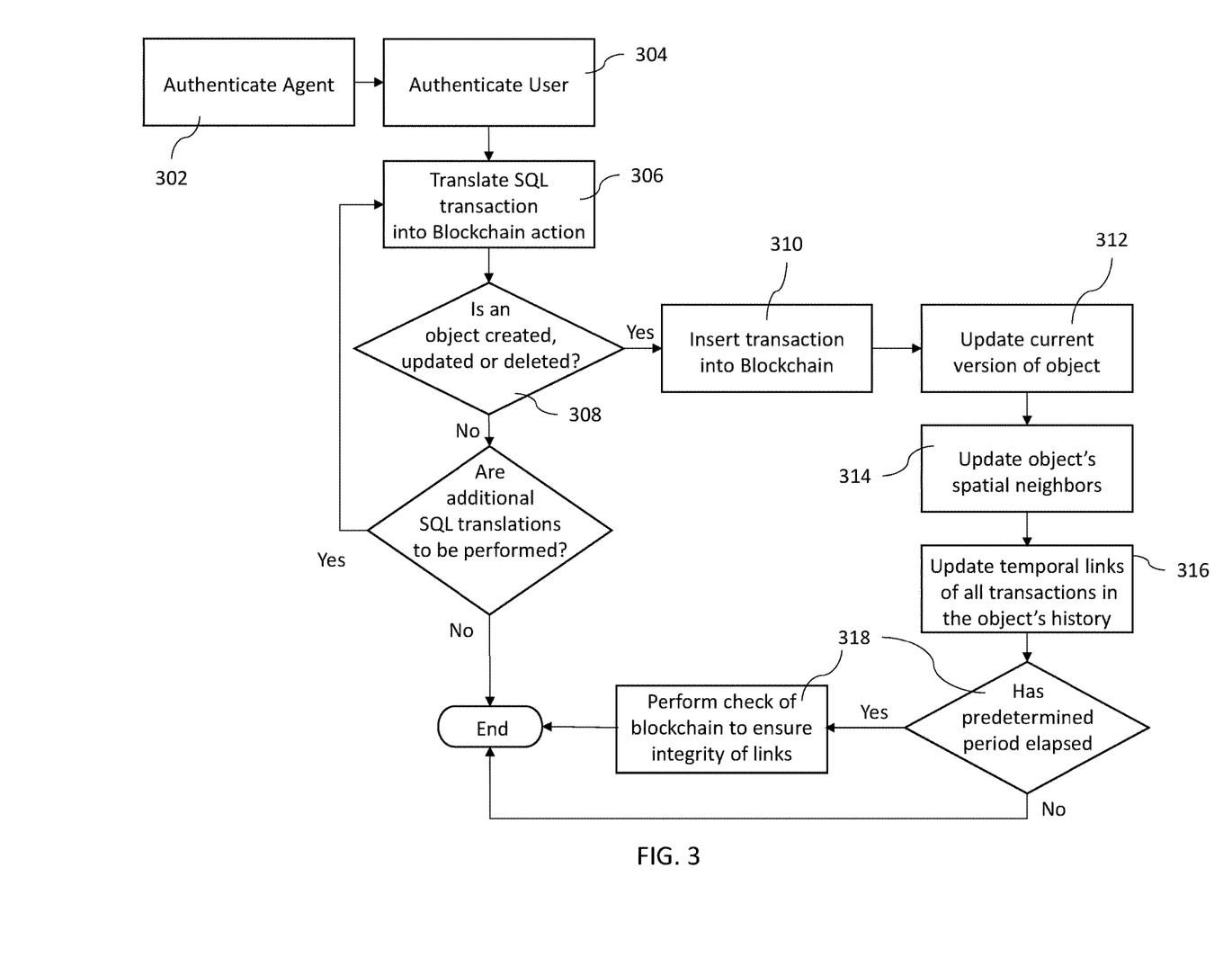
FIG. 3 is a representation of the components of a blockchain block supporting a preferred embodiment of the invention.

The Agent 202 presents itself as a SQL database server, making the blockchain transparent to the application and user 104. FIG. 3 provides a flowchart representing various processes and functions performed by the Agent 202 in a preferred embodiment of the invention. As shown, the Agent 202 authenticates itself 302 on the blockchain's network and with other connected Agents. The Agent 202 also authenticates 304 any users 204 trying to connect to it. The particular processes for managing user or blockchain authentication are highly dependent upon the specifics of the network and hardware supporting the blockchain system and will not be discussed. User authentication could be managed by an external authorization server, rather than maintaining its own user-file, on or off the chain.

Once a user 204 is authenticated, the Agent 202 is responsible for translating SQL queries into blockchain activities with a database 206. To do this, it utilizes a SQL parsing engine. The nature of blockchain provides the full historical record for a database, and the parsing engine must support extended SQL commands for performing temporal queries as described in the Space-Time Linking section.

The Agent 202 is also responsible for maintaining links in the Space-Time structure. Whenever data is created, updated, or deleted 308, the Agent 202 needs to traverse the chain to update all of the Space-Time links 314, 316. Since this could take a fair amount of time, especially with data that is frequently updated, this activity could be queued for later processing, to avoid blocking the user 204 from performing other work.

To ensure that the Blockchain database 206 does not go stale, the create, update, and delete processes consist of three distinct operations. First, a transaction is inserted onto the blockchain 310. This is done so there is a link to the transaction. Second, the current version of an object 312 and the current version of its spatial neighbors 314 are updated. This allows the new transaction to be found when performing a query. Finally, all of the transactions in the object's history must have their temporal last link updated to the new transaction 316. This is done to expedite search times. The first two actions must be done at the time the SQL action is performed, but the final action can be completed later. The temporal last link updates are not required for the Blockchain database 206 to function properly, but serve to make it more efficient. For this reason, the process can be queued and performed when the Agent 202 is less busy or as part of the next time that object is queried.

Due to the use of a mutable portion 128, 130 in a transaction 104, 106, the integrity of the forward-facing links, such as the Temporal Next, cannot be guaranteed. If there are multiple Agents operating on the same blockchain, they may contain different values for those forward-facing links in their local copy of the blockchain. To resolve this potential issue, the backwards facing links, such as the Temporal Previous links, are stored in the immutable portion 132, 134 of the transaction 104, 106. The Agent 202 can run periodic integrity checks 318 on the blockchain to ensure that all the links point to an appropriate location, and even update broken links if they appear. This allows Blockchain database 206 to be made less susceptible to corruption.

The Agent 202 may also require the capability to communicate directly with other Agents connected to the blockchain. This communication channel could be used to validate other Agents being added to the network or as administrative management. While most things can be written directly to the blockchain, depending on the authentication mechanisms used, managing a user-file inside of the blockchain may not be secure enough.

Another function the Agent 202 is the caching of portions of the Blockchain database 206, used to improve SQL query performance. The Agent 202 can keep a partial map of a Blockchain database 206 in memory or as a local file. This map would point to the most recent transactions of which the Agent 202 was aware. This allows the Agent 202 to bypass regular search entry points, jumping straight to a recent version of the SQL Object, check for any updates, and continue as normal. The cache can be restricted by size, read count, or age. This allows the cache to focus on frequently or recently accessed objects. This allows the administrator to tune the cache to best suit the needs of individual databases.

This combination of technologies is ideal for a scenario where multiple entities need to use a shared relational database but have limited trust between each other. This design allows entities to alter items in the database, while providing transparency of those actions to the other entities involved. This provides shared accountability and prevents any one entity from acting maliciously. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A database management comprising:
    at least one processor;
    at least one memory storing:
        a relational database, the relational database comprising a plurality of data objects; and
        instructions which, when executed by the at least on processor, cause the data base management system to execute an agent providing a domain-specific programing language user interface to the relational database,
    wherein, in response to the creation, modification or deletion of at least one data object within the relational database, the agent is configured to:
        insert a transaction onto a blockchain;
        update the current version of the at least one data object, including updating at least one space-time link within the data object;
        update the current version of the data objects neighboring the at least one data object in the relational database, including updating at least one space-time link within the data objects neighboring the at least one data object; and
        update a temporal last link of the transactions in the at least one data object's history to reflect the inserted transaction, and
    wherein, in response to receiving a query at the database management system, the agent is configured to perform the query of the relational database on the blockchain using the at least one space-time link within the at least one data objects and the at least one space-time link within the data objects neighboring the at least one data object to traverse the blockchain from the at least one data object to the data objects neighboring the at least one data object.

2. The database management system of claim 1 wherein the domain-specific programing language is Structured Query Language.

3. The database management system of claim 1 wherein the agent is further configured to authenticate at least one user.

4. The database management system of claim 1 wherein the agent is further configured to authenticate itself.

5. The database management system of claim 1 wherein the agent is further configured to perform periodic integrity checks to determine if all blockchain links point to an appropriate location.

6. The database management system of claim 1 wherein the agent is further configured to utilize a deletion key and thereby enable the decryption of transaction data.

7. The database management system of claim 6 wherein the deletion key is disabled with respect to transaction data that is to be permanently deleted.

8. The database management system of claim 1, wherein the data object is included within a data block configured to support the creation, modification and deletion of relational database data objects, the data block comprising:
   immutable data comprising:
      a transaction ID;
      a transaction timestamp;
      a domain-specific programming language action;
      spatial links to a first block and a previous block, and temporal links to a next level and a last block.

9. The database management system of claim 1, wherein the data block comprises mutable data including a deletion key that enables an authorized node to decrypt transaction data just by reading the transaction.

10. The database management system of claim 1, wherein the data block further includes a header that comprises:
    a block identifier;
    a hash of the data block;
    a Merkel tree root;
    a hash of a previous data block;
    a block timestamp; and
    unhashed block metadata.

11. A method for managing a relational database comprising the steps of:
    translating a domain-specific programing language user interface to the relational database, wherein, in response to the creation, modification or deletion of at least one data object within the relational database, an agent is configured to:
       insert a transaction onto a blockchain;
       update the current version of the at least one data object, including updating at least one space-time link within the data object;
       update the current version of the data objects neighboring the at least one data object in the relational database, including updating at least one space-time link within the data objects neighboring the at least one data object; and
       update a temporal last link of the transactions in the at least one data object's history of the inserted transaction; and
    performing a query of the relational database on the blockchain using the at least one space-time link within the at least one data objects and the at least one space-time link within the data objects neighboring the at least one data object to traverse the blockchain from the at least one data object to the data objects neighboring the at least one data object.

12. The method for managing a relational database of claim 11 wherein the domain-specific programing language is Structured Query Language.

13. The method for managing a relational database of claim 11 wherein the agent is further configured to authenticate a user.

14. The method for managing a relational database of claim 11 wherein the agent is further configured to authenticate itself.

15. The method for managing a relational database of claim 11 wherein the agent is further configured to perform periodic integrity checks to determine if all blockchain links point to an appropriate location.

16. The method for managing a relational database of claim 11 wherein the agent is further configured to utilize a deletion key and thereby enable the decryption of transaction data.

17. The method for managing a relational database of claim 16 wherein the deletion key is disabled with respect to transaction data that is to be permanently deleted.

* * * * *